No. 704,101. Patented July 8, 1902.
F. K. POPPLEWELL.
NUT LOCK.
(Application filed Oct. 29, 1901.)
(No Model.)
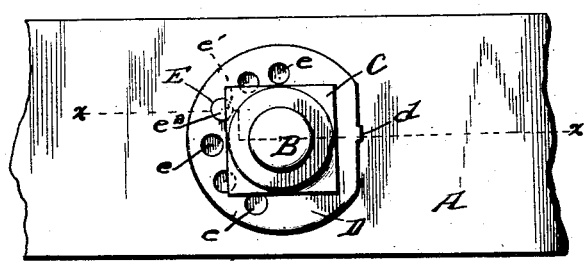
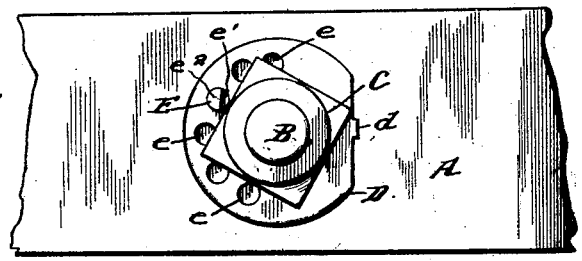
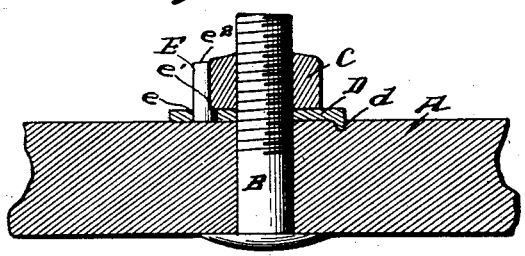
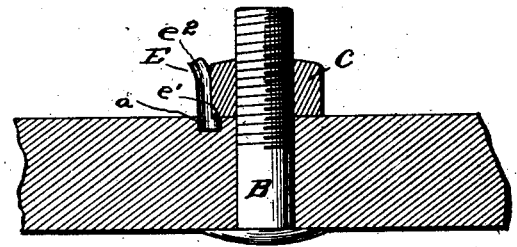
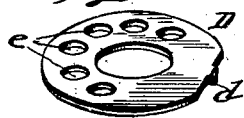
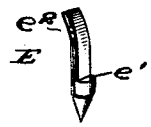

UNITED STATES PATENT OFFICE.

FELIX KING POPPLEWELL, OF BRONTE, TEXAS.

NUT-LOCK.

SPECIFICATION forming part of Letters Patent No. 704,101, dated July 8, 1902.

Application filed October 29, 1901. Serial No. 80,387. (No model.)

*To all whom it may concern:*

Be it known that I, FELIX KING POPPLEWELL, a citizen of the United States, residing at Bronte, in the county of Coke and State of Texas, have invented certain new and useful Improvements in Nut-Locks; and I do hereby declare the following to be a full, clear, and exact description of the invention, such as will enable others skilled in the art to which it appertains to make and use the same.

This invention relates to an improvement in nut-locks, and has for its object the provision of a locking attachment which may be used in connection with any bolt and nut of the ordinary type. The attachment comprises, essentially, a shouldered pin adapted to underlie the lower surface of the nut, adjacent one of the corners thereof, and project into suitably-formed receiving-apertures in the surface of the member to be clamped or in a washer designed to be employed between said member and the nut.

In the accompanying drawings, forming part hereof, the preferable embodiments of the invention are shown for the purpose of illustration, and from said drawings, when considered in connection with the detailed description hereinafter and the appended claim, the novel details in the construction and arrangement of the several portions of the lock will be apparent.

In said drawings, Figure 1 is a top plan view showing the lock in its normal position. Fig. 2 is a similar view showing the nut turned sufficiently to permit the withdrawal of the shouldered pin. Fig. 3 is a sectional view on the line $x$ $x$ of Fig. 1. Fig. 4 is a similar sectional view showing the manner of utilizing the locking-pin when the washer is dispensed with. Fig. 5 is a detailed perspective view of the washer, and Fig. 6 is a detailed perspective view of a modified form of pin.

Referring more specifically to the drawings, A designates any suitable member desired to be clamped.

B designates a bolt of ordinary type, and C the nut engaging the latter. A washer D, centrally apertured to fit over the end of the bolt, is adapted to fit between the member A and nut C. This washer is provided with one or more depending sharp-pointed prongs $d$, embedded in the member A to prevent any rotary movement of the washer. The washer is also provided with a plurality of apertures or pockets $e$, which may or may not pass entirely through the washer, arranged concentrically relative to the axis of the bolt at points a distance from said axis slightly less than the distance from the same axis to the extreme corner of the nut. The reasons for such arrangement will be hereinafter stated. A suitable locking-pin E, provided with a head or shouldered portion $e'$ of the same shape as the apertures or pockets $e$, adapted to fit in any one of said apertures and with a shank $e^2$, is utilized to normally occupy a position in the path of rotation of the corner of the nut to prevent the back turning of the same. The pin E is flattened on one side to permit the head of the same to project beneath the surface of the nut, and when the nut is to be locked in position one corner of the same is forced slightly beyond one of the apertures to entirely clear the same, when the head of the pin is inserted in said aperture and the nut thereafter turned backward sufficiently to overlie said head of the pin, whereupon the adjacent corner of the nut will abut the shank of the pin and prevent it from any further backward turning.

In Fig. 4 the locking-pin is shown as seated in suitably-formed apertures or pockets $a$, formed directly in the upper surface of the member to be clamped.

While certain details of the construction of the pin, washer, &c., have been described, it is to be understood that various changes and alterations may be made without departing from the spirit of the invention. Thus the pin instead of being seated in apertures in the washer or surface of the member to be clamped may be provided with a curved shank and a pointed head, Fig. 6, to be forced into the material of said member as desired. This curving of the shank facilitates the insertion and hammering of the pin in place.

Having thus described the invention, what is claimed as new, and desired to be secured by Letters Patent, is—

In combination with a member having a circular recess, of a bolt and nut for clamping said member in position, a locking-pin E provided with a head $e'$ circular in cross-section and adapted to be inserted in said recessed member and rotated therein, and a shank portion integral with said head $e'$ and flattened on the side adjoining the head, substantially as and for the purpose described.

In testimony whereof I affix my signature in presence of two witnesses.

FELIX KING POPPLEWELL.

Witnesses:
THOMAS LEE BEEMAN,
JESSE ALONZO SHOOK.